United States Patent
Lecky

(10) Patent No.: US 7,270,900 B2
(45) Date of Patent: Sep. 18, 2007

(54) AUTOMATIC MEASUREMENT OF FUEL CELL RESISTANCE

(75) Inventor: John Edward Lecky, Albany, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 660 days.

(21) Appl. No.: 10/700,121

(22) Filed: Nov. 3, 2003

(65) Prior Publication Data

US 2005/0092617 A1 May 5, 2005

(51) Int. Cl.
H01M 8/04 (2006.01)
(52) U.S. Cl. .......................................... 429/13; 429/23
(58) Field of Classification Search ...................... None
See application file for complete search history.

(56) References Cited

U.S. PATENT DOCUMENTS

| | | | |
|---|---|---|---|
| 4,562,123 A | 12/1985 | Shimizu et al. | |
| 4,810,597 A | 3/1989 | Kumagai et al. | |
| 5,439,756 A | 8/1995 | Anani et al. | |
| 5,585,749 A | 12/1996 | Pace et al. | |
| 5,587,250 A | 12/1996 | Thomas et al. | |
| 5,659,206 A | 8/1997 | Taguchi et al. | |
| 5,670,266 A | 9/1997 | Thomas et al. | |
| 5,744,984 A | 4/1998 | Drapac et al. | |
| 5,916,699 A | 6/1999 | Thomas et al. | |
| 6,087,812 A | 7/2000 | Thomas et al. | |
| 6,322,917 B1 | 11/2001 | Acker | |
| 6,376,111 B1* | 4/2002 | Mathias et al. | 429/13 |
| 6,504,339 B2 | 1/2003 | Parks et al. | |
| 6,583,523 B1 | 6/2003 | Bhate | |
| 6,590,370 B1 | 7/2003 | Leach | |
| 6,620,538 B2* | 9/2003 | Bai et al. | 429/23 |
| 6,975,813 B1* | 12/2005 | Inoue et al. | 398/197 |
| 2005/0110453 A1 | 5/2005 | Lecky | |

FOREIGN PATENT DOCUMENTS

SU 1610522 A1 11/1990
WO WO 03/092093 * 11/2003

* cited by examiner

Primary Examiner—Jonathan Crepeau
(74) Attorney, Agent, or Firm—Cesari and McKenna LLP

(57) ABSTRACT

This invention presents a method and apparatus for measuring the resistance across a fuel cell stack, a fuel cell array, or an individual fuel cell. The invention employs a fixed load circuit to switch a fixed resistance or to connect a fixed load current to the stack or array. When the load is turned on, the stack voltage is read, then the load is turned off and the stack voltage is read again to determine the voltage jump. A change in resistance is calculated that is related to cell hydration. In accordance with another aspect of the invention, the stack includes a programmable DC-DC switch under PWM microprocessor control. The DC-DC converter is used to switch the load on and off and the voltage jump is read using a sample and hold methodology with an optional instrumentation amplifier and a Kalman filter to determine accurate results for resistance with no additional hardware. The resistance measurements are used to identify and evaluate cell hydration.

7 Claims, 5 Drawing Sheets

AUTOMATIC MEASUREMENT OF FUEL CELL RESISTANCE

BACKGROUND OF THE INVENTION

1. Field of the Invention

The present invention relates generally to fuel cells and, more specifically, to measuring certain operating characteristics of such fuel cells, fuel cell stacks and fuel cell arrays.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and generally requires expensive components, which occupy significant volume, reformer based systems are presently limited to comparatively large, high power applications.

Direct oxidation fuel cell systems may be better suited for a number of applications in smaller mobile devices (e.g., mobile phones, handheld and laptop computers), as well as in some larger applications. In direct oxidation fuel cells of interest here, a carbonaceous liquid fuel (typically methanol or an aqueous methanol solution) is introduced to the anode face of a membrane electrode assembly (MEA).

One example of a direct oxidation fuel cell system is a direct methanol fuel cell system or DMFC system. In a DMFC system, a mixture comprised predominantly of methanol, or methanol and water, is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed to completion at an acceptable rate, as is discussed further hereinafter.

Typical DMFC systems include a fuel source, fluid and effluent management systems, and air management systems, as well as a direct methanol fuel cell ("fuel cell"). The fuel cell typically consists of a housing, hardware for current collection and fuel and air distribution, and a membrane electrode assembly ("MEA") disposed within the housing.

The electricity generating reactions and the current collection in a direct oxidation fuel cell system generally take place within the MEA. In the fuel oxidation process at the anode, the products are protons, electrons and carbon dioxide. Protons (from hydrogen found in the fuel and water molecules involved in the anodic reaction) are separated from the electrons. The protons migrate through the membrane electrolyte, which is impermeable to the electrons. The electrons travel through an external circuit, which connects the load, and are united with the protons and oxygen molecules in the cathodic reaction, thus providing electrical power from the fuel cell.

A typical MEA includes a centrally disposed protonically-conductive, electronically non-conductive membrane ("PCM", sometimes also referred to herein as "the catalyzed membrane"). One example of a commercially available PCM is NAFION® a registered trademark of E.I. Dupont de Nemours and Company, a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer on the anode side is employed to evenly distribute the liquid fuel mixture across the catalyzed anode face of the PCM, while allowing the gaseous product of the reaction, typically carbon dioxide, to move away from the anode face of the PCM. In the case of the cathode side, a diffusion layer is used to allow a sufficient supply of and a more uniform distribution of gaseous oxygen across the cathode face of the PCM, while minimizing or eliminating the collection of liquid, typically water, on the cathode aspect of the PCM. Each of the anode and cathode diffusion layers also assist in the collection and conduction of electric current from the catalyzed PCM through the load.

Direct oxidation fuel cell systems for portable electronic devices should be as small as possible at the power output required. The power output is governed by the rate of the reactions that occur at the anode and the cathode of the fuel cell. More specifically, the anode process in direct methanol fuel cells based on acidic electrolytes, including polyperflourosulfonic acid and similar polymer electrolytes, involves a reaction of one molecule of methanol with one molecule of water. In this process, the oxygen atom in the water molecule is electrochemically activated to complete the oxidation of methanol to a final $CO_2$ product in a six-electron process.

More specifically, direct methanol fuel cell system produces electricity without combustion by oxidizing a carbonaceous fuel (typically methanol in an aqueous solution) on a catalyzed protonically conductive membrane.

The electrochemical reaction equations are as follows:

| | |
|---|---|
| Anode: $CH_3OH + H_2O = CO_2 + 6H^+ + 6e^-$ | Equation 1 |
| Cathode: $6H^+ + 6e^- + 3/2O_2 = 3H_2O$ | Equation 2 |
| Net Process: $CH_3OH + 3/2O_2 = CO_2 + 2H_2O$ | Equation 3 |

Generation of electricity continues until one of the fluids is not available. DMFCs are typically described as "on" i.e. providing electrical current by reacting the fuel and oxygen to generate water, or "off" i.e. at least one fluid is not available because all fuel has been consumed, or air (or other source of oxygen) is prevented from reaching the cathode face of the PCM. Those skilled in the art will recognize that fuel can be delivered to the anode aspect of the MEA as a liquid, or in vaporous form.

Thus, the efficiency of a direct methanol fuel cell system is dependent in part on the amount of fluids and products that are present in the active catalyzed membrane areas and also depends upon adequate hydration of the membrane. For example, particularly in a vapor fed cell, there is a tendency for the catalyzed membrane to dry out during operation, or when the fuel cell is shut down. This is because the vapor feed is not aqueous, instead it is substantially pure fuel, such that there is essentially no excess water on the anode side to keep the membrane hydrated. However, as stated, the membrane should remain well-hydrated for optimal performance. Further, when the fuel cell is not in operation, the membrane of a microfuel cell system may become dehydrated due, at least in part, to the lack of water generation at the cathode.

This also undesirable particularly in situations when the fuel cell is in a standby status, such as when the fuel cell system is employed in a hybrid power source that contains the fuel cell and a battery. When the battery discharges, or during re-charge, the fuel cell begins to operate to power the device. However, while the battery (or other power source) is providing power to the device, the fuel cell may be in a shut down state in which the water-generating cathodic reactions do not occur. During this time period, cell dehydration can occur, and if it does, the fuel cell may then not be able to provide sufficient power when needed, but will require that the membrane electrolyte become rehydrated to allow for the proper reactions to occur.

Accordingly, it is desirable to determine whether the cell is adequately hydrated in order to facilitate the continued generation of electricity, and in order to avoid the time lag associated with rehydrating the membrane electrolyte and/or the fuel cell system. It has not always been straightforward, however, to obtain a reading or measurement of the amount of hydration existing at any one particular time in the membrane. Given the number of internal components in a microfuel cell, it is not always easy to measure the various operating characteristics of such fuel cells, particularly when the fuel cells are operated during elevated temperature runs.

It has been observed that fuel cell stack or array resistance is related to cell hydration. More specifically, cell resistance is a function of many things, including membrane material, geometry, compression, age and hydration. Of these, the one that changes most rapidly (in a matter of several minutes) is cell hydration. Thus, using a resistance measurement it is possible to determine whether the cell is adequately hydrated. More specifically, if resistance is increasing over time, this in an indication that the cell is drying out. If resistance is decreasing over time, this in an indication that the cell is becoming more hydrated and, perhaps, too hydrated.

Thus, the fuel cell stack (or array) resistance can be measured to evaluate and predict cell hydration. In practice, however, this type of measurement has required the use of an integrated fuel cell testing system such as that provided by Arbin Instruments of College Station, Texas. Such instrumentation is bulky, expensive and may require a separate power supply. Requiring additional hardware components is particularly disadvantageous in microfuel cell application where size and form factors are critical.

There remains a need therefore, for a more easily implemented method and apparatus for measuring series resistance in a direct oxidation fuel cell, a direct oxidation fuel cell stack or a direct oxidation fuel cell array.

It is thus an object of the invention to provide a method and apparatus for readily measuring the resistance of the fuel cell, the fuel cell stack or fuel cell array, which can in turn provide information about hydration within a fuel cell and more particularly, about adequate hydration of the membrane electrolyte.

SUMMARY OF THE INVENTION

The limitations of prior techniques have been overcome by the present invention, which provides a unique method and apparatus for measuring the resistance of a direct oxidation fuel cell system. As used herein, a direct oxidation fuel cell system shall include a direct oxidation fuel cell stack, a direct oxidation fuel cell array, and/or an individual direct oxidation fuel cell. Accordingly, although the illustrative embodiment of the invention is described with reference to a fuel cell stack, the invention is not limited thereto, but it is readily adaptable for use with an individual fuel cell and/or a fuel cell array. Thus, the word "stack," as used herein shall include an individual fuel cell and a fuel cell array, and the invention equally applies to an array or an individual fuel cell. Furthermore, the illustrative embodiment is also described with reference to a "direct oxidation fuel cell," such as a direct methanol fuel cell (DMFC), however, it should also be understood that the invention is equally applicable to other types of fuel cells, such as hydrogen fuel cells.

In accordance with the invention, the load on the fuel cell stack is varied, and the resultant changes in stack voltage, and current, allow a calculation of fuel cell resistance. More specifically, the initial stack voltage, and stack current are read. Then, the stack load is varied, and a new stack current and stack voltage are immediately measured. From these measurements, one can readily solve for the stack resistance, which provides an indication of cell hydration. As noted, as resistance increases, there is a tendency towards cell dryout, so an increase in resistance over time indicates that the cell could be drying out.

The invention includes several alternative methods for varying the load on the fuel cell stack. In accordance with one aspect of the invention, a fixed load current, I, is electrically connected to the stack, and the stack voltage is read. Then the fixed load current is disconnected, and the stack voltage is read again. The change in stack voltage is thus measured and, as described in further detail herein, the load current divided by the voltage is the resistance.

In another embodiment, a fixed resistance is switched on to the stack. When the resistance is removed, as described in detail hereinafter, the stack resistance can be calculated from the resulting voltage change.

In accordance with yet a further embodiment of the present invention, the load on the direct oxidation fuel cell stack is varied using a microcontroller that is adjusting the input parameters to a DC-DC converter circuit. In this embodiment, a particular duty cycle is set on the DC-DC converter switches, and the stack voltage and current are recorded. Next, the duty cycle is abruptly changed, and a new voltage and current are recorded immediately. Knowing the pre-load voltage and current, the stack resistance is then calculated. The resistance value is related to cell hydration and this indicates whether the cell is adequately hydrated. In this implementation, hardware that already exists in the system is employed in such a manner as to provide the fixed resistance or fixed load current.

BRIEF DESCRIPTION OF THE DRAWINGS

The invention description below refers to the accompanying drawings of which.

DETAILED DESCRIPTION OF AN ILLUSTRATIVE EMBODIMENT

Figure 1:
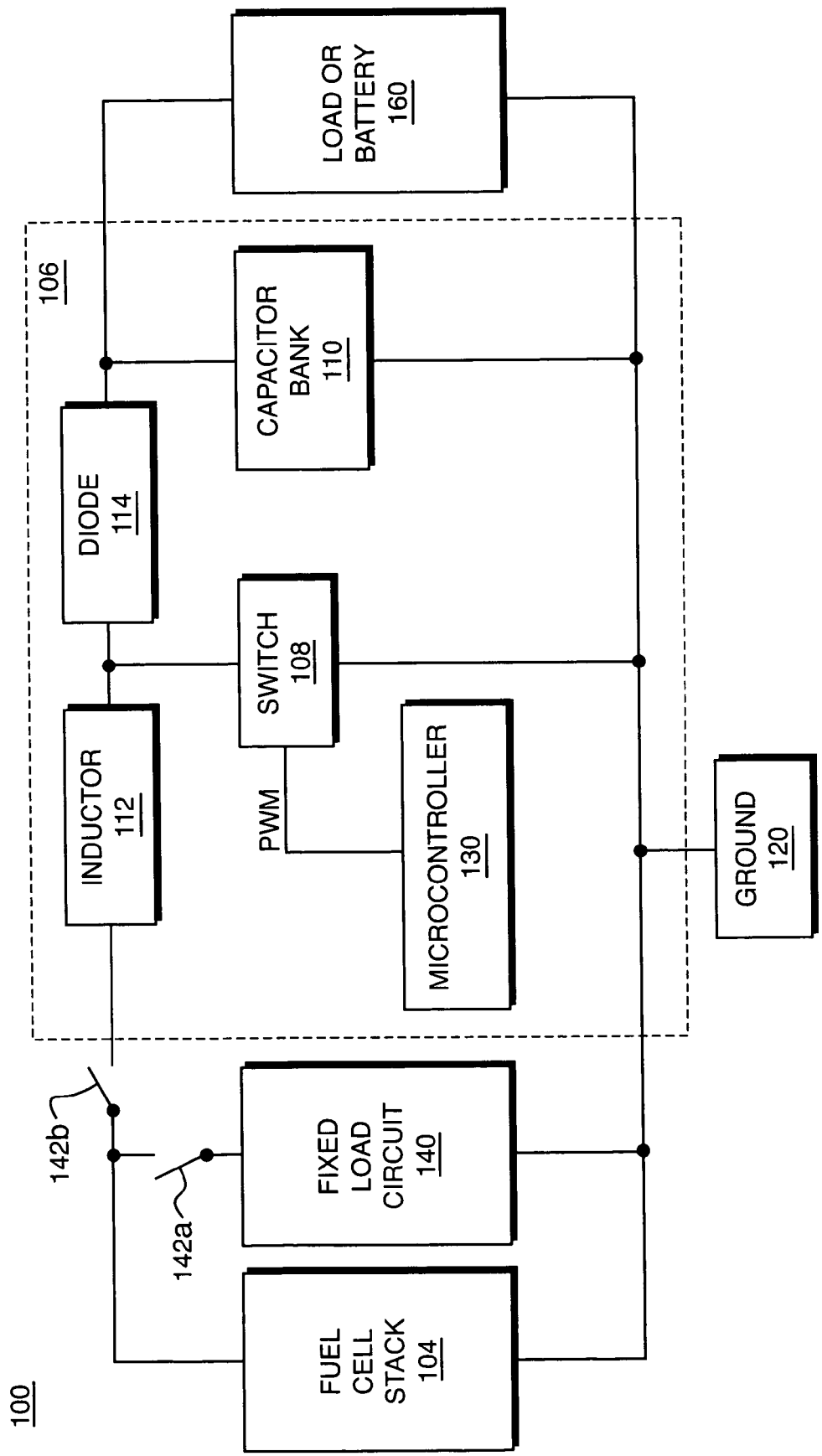
FIG. 1 is a schematic block diagram of the system of the present invention that can be used to vary a fixed load across a direct oxidation fuel cell system.

FIG. 1 schematically illustrates a system 100 for controlling a fuel cell system, which in the illustrative embodiment is a fuel cell stack 104. A switching DC-DC converter circuit illustrated within dashed box 106 is employed to control certain aspects of the operation of the fuel cell stack 104.

By way of background, the DC-DC converter circuit 106 operates in a boost configuration in the following manner. In a basic boost configuration, if the switch 108 (typically comprised of a set of switches) has been open for a long time, the voltage across the capacitor bank 110 is equal to the input voltage from the fuel cell stack 104. During a charge phase, when the switch 108 closes, the input voltage is impressed across the inductor 112. The diode 114 prevents the capacitor bank 110 from discharging to ground 120, because the input voltage is DC, current through the inductor 112 rises linearly with time at a rate that is proportional to the input voltage divided by the inductance 112. The switch 108 is controlled by microcontroller 130, which has been programmed to use pulse-width modulation (PWM) control of the programmable DC-DC switches in the converter 106.

As noted, the DC-DC converter circuit 106 can be used to control certain aspects of the fuel cell operation. For example, it may be used to optimize fuel cell output voltage, as operating conditions change. This is further described in commonly-assigned U.S. patent application Ser. No. 10/261,823, filed on Oct. 1, 2002 by Leach, for a SWITCHING DC-DC POWER CONVERTER AND BATTERY CHARGER FOR USE WITH DIRECT OXIDATION FUEL CELL POWER SOURCE, which is incorporated herein. The DC-DC converter 12 may be used with battery 18 to provide power to a load or application device 20.

In addition to maintaining fuel cell output voltage at a desired level, it is also important to check whether the internal components of the fuel cell are operating optimally. One such component is the membrane (or PCM). The membrane must remain adequately hydrated in order to operate effectively. As noted, one indication of changes in hydration would be a change in fuel cell resistance.

Figure 2:
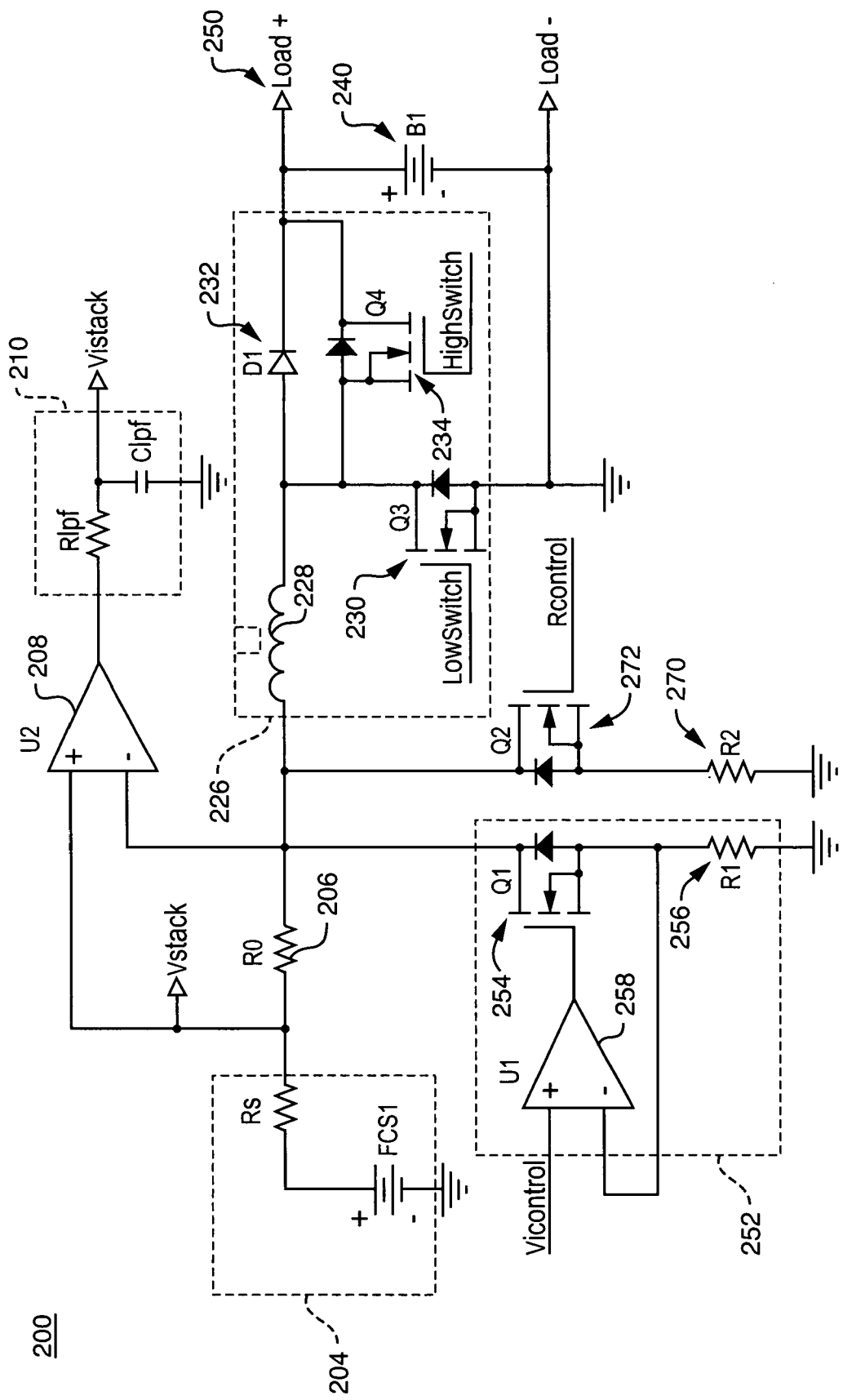
FIG. 2 is a more detailed circuit diagram of one implementation of the present invention.

In accordance with the present invention, a circuit, illustrated in FIG. 2 provides one implementation of the fixed load circuit 140 (which may be switched into the circuit as schematically illustrated by switches 142a and 142b) and the DC-DC converter 106 (FIG. 1), which allows fuel cell resistance measurements using several alternative techniques. The circuit 200 includes the fuel cell stack 204 being modeled by an ideal voltage source FCS1 and a series resistance Rs. Both FCS1 and Rs change with time and fuel cell state. FCS1 changes with applied load, while Rs does not. This discrepancy can be used to measure Rs independent of FCS1 changes. Rs is measured indirectly using the remainder of the circuit shown in FIG. 2.

Fuel cell stack voltage (Vstack) can be readily measured. Stack output is routed through a low-value resistor R0 (206), and the voltage drop across the resistor 206 is applied to a differential amplifier U2 (208) with fixed gain G2. Resistor/capacitor pair R1pf/C1pf form a low-pass filter 210 whose time constant is very fast with respect to fuel cell stack chemistry and very slow with respect to DC-DC converter switching frequency. In this way, the average current coming out of the fuel cell stack (Istack) is simply Vistack/(G2 R0).

The DC-DC converter 226 consists of inductor L1 (228), low-side switch Q3 (230), diode D1 (232), and high-side switch Q4 (234). Q3 and Q4 are switched in opposition and at high frequency to boost the fuel cell stack voltage to the load voltage supported by battery B1 (240). As the on-percentage of Q3 is increased (forcing a corresponding increase in the off-percentage of Q4), the fuel cell stack 204 is more heavily loaded and sends more power to the storage battery B1 (240) and the Load 250. This causes the voltage FCS1 generated by the fuel cell stack 204 to decrease in accordance with fuel cell chemistry and fuel. In addition, the fuel cell stack resistance Rs will cause a corresponding reduction in measured Vstack.

The solutions provided by the present invention involve measuring the fuel cell stack resistance Rs. The inventive Rs measurement techniques generally involve three steps:

1) Measuring an initial Vstack and Istack,
2) Changing fuel cell stack load and immediately measuring a new Vstack and Istack,
3) Calculating Rs as the ratio of the change in Vstack to the change in Istack.

The following describes several illustrative examples of methods embodying the invention in which the change in fuel cell stack load, described as the second step above, is implemented, using the circuit of FIG. 2. It should be understood that there may be other components or additional components that can be employed in order to vary the load, while remaining within the scope of the present invention.

Constant Current Load

Figure 3:
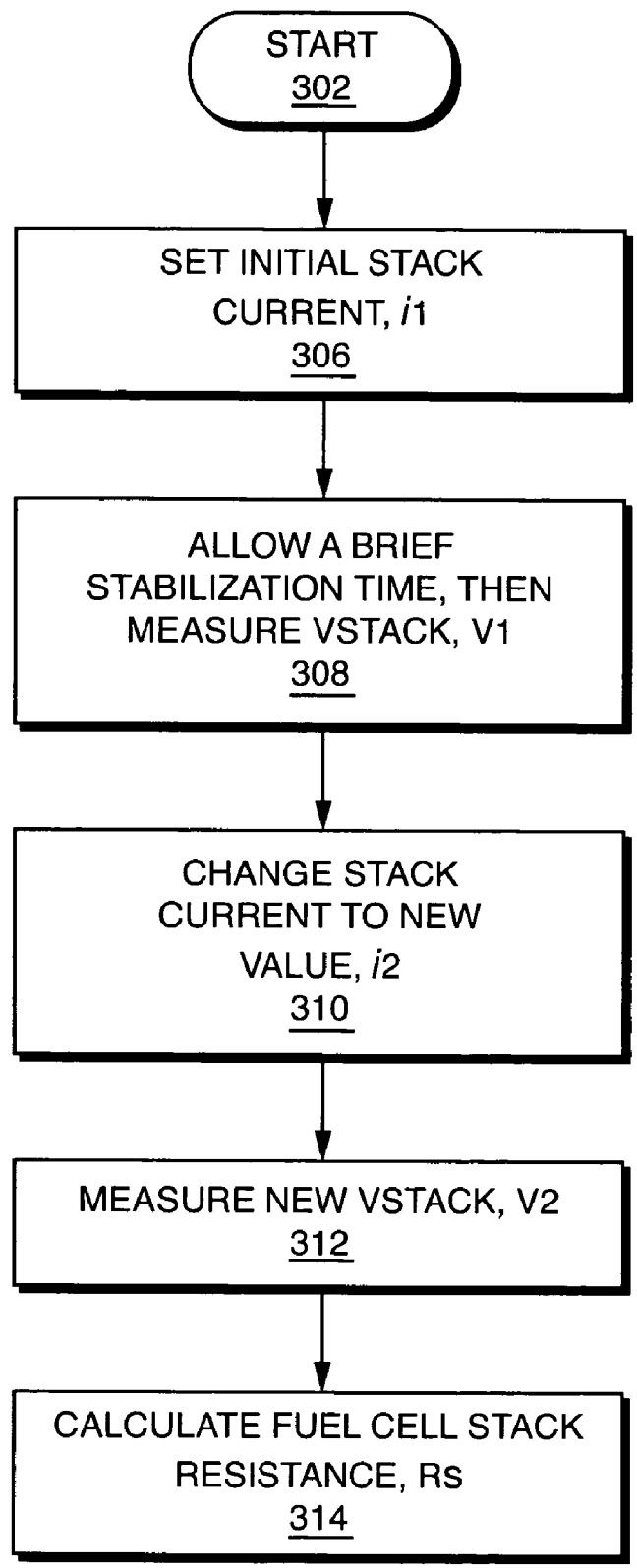
FIG. 3 is a flowchart illustrating a procedure in accordance with the invention regarding constant current.

In accordance with another aspect of the invention, a constant current is applied to the stack. In this technique, a constant current sink 252 is implemented in the circuit of FIG. 2 with the following components: power transistor Q1 (254), sense resistor R1 (256), and opamp U1 (258) is used to set stack current. Referring now to the procedure 300 of FIG. 3, which begins at the start step 302, the DC-DC converter 226 is turned off with switch Q3 and Q4 left open. A voltage Vicontrol (1) sets the current that the stack is forced to produce (step 306). This current is simply i1=Vicontrol(1)/R1. As illustrated in step 308, after a brief stabilization time, an initial v1=Vstack is measured. Next, a new Vicontrol(2) is applied changing the fuel cell stack current to i2=Vicontrol(2)/R1. A new v2=Vstack is immediately recorded before the fuel cell chemical voltage FCS1 can appreciably change in step 312. Rs is now calculated as (v2−y1)/(i2−i1), step 314. It is noted that the measurement is still valid if either i1 or i2 is chosen to be 0 (by setting the corresponding Vicontrol to 0). In practice, this choice may simplify the calculations.

Constant Resistance Load

Figure 4:
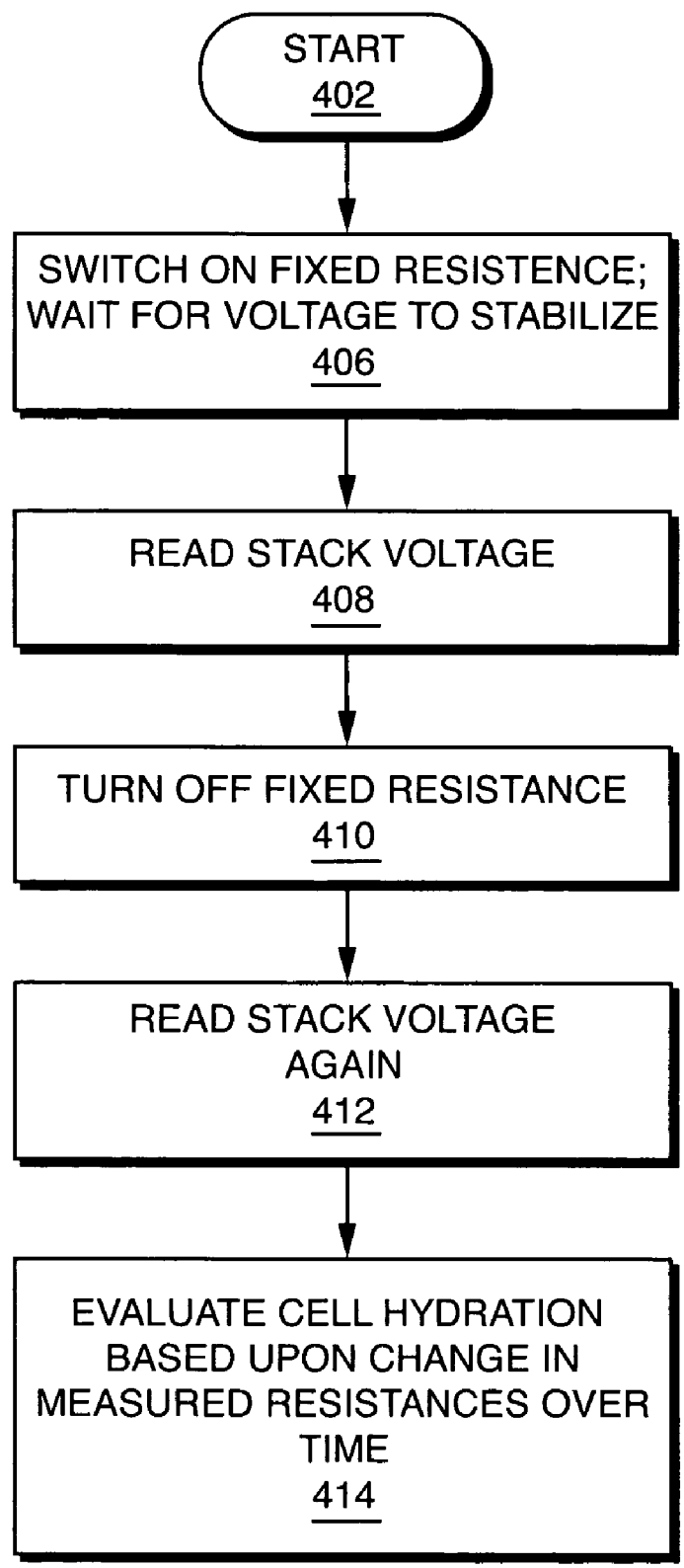
FIG. 4 is a flow chart illustrating an alternative method in accordance with the present invention involving a fixed resistance.

Another method of measuring stack resistance in accordance with the invention is to use a constant resistance load. In this technique, a fixed resistance load R2 270 is switched onto the stack by switch Q2 272. The DC-DC converter 226 is first turned off with switches Q3 and Q4 left open, and switch Q2 is left open while the fuel cell stack stabilizes at V1=Vstack. Note that in this configuration, fuel cell stack current i1=0. Now switch Q2 is closed and the fuel cell stack voltage V2=vstack is immediately measured. The fuel cell stack current i2=Vistack(G2 R0). Finally, Rs is again calculated as (v2−y1)/(i2−i1), which in this case is simply (v1−v2)/i2. The procedure 400 of FIG. 4 illustrates this aspect of the invention and it begins at step 402, and at step 404 the system is initialized such that the fuel cell stack is powered on and is operating to provide power to a load, such as the load 250 or battery 240 (FIG. 2). As noted, the fixed resistance R2 is switched across the stack, as illustrated at step 406, and the voltage is allowed to stabilize. The output voltage of the stack v1 is then read, as illustrated in step 408. The fixed resistance is then removed (close switch Q2), as illustrated in step 410, and the stack voltage is immediately read again, as shown in step 412. Based on the reading of step 412, Rs can be calculated using which information cell hydration can be evaluated, as shown in step 414. More specifically, relative resistance change over time is calculated to determine cell hydration.

DC-DC Converter

In accordance with a further aspect of the invention, the DC-DC converter hardware itself, which is already present in the fuel cell system, can be used to vary the load.

Figure 5:
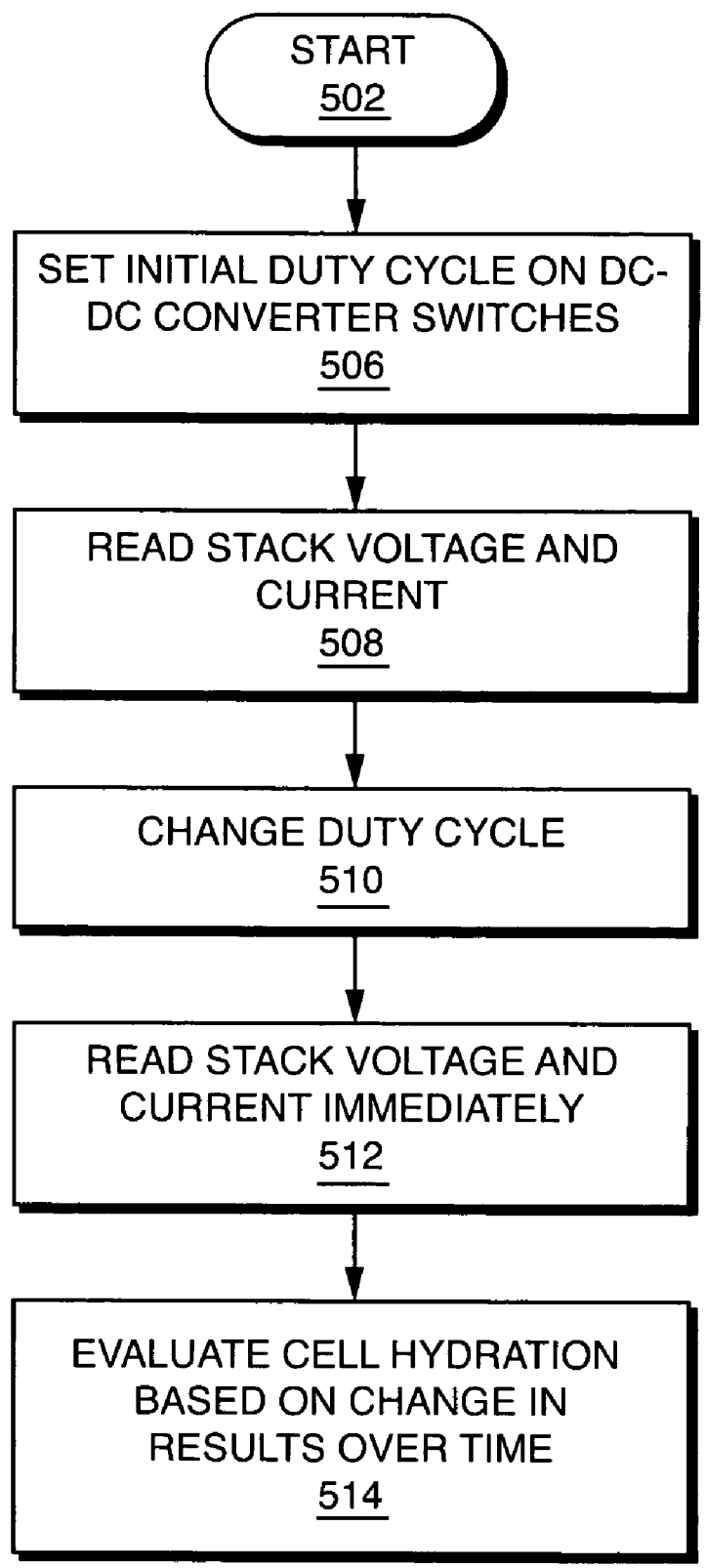
FIG. 5 is a flow chart of a procedure of the present invention in which the DC-DC converter is employed.

This technique utilizes the DC-DC converter hardware 226 directly, and is in some cases may be more attractive since the additional hardware used in the first two implementations is not required. As illustrated in FIG. 5, a particular duty cycle is set on the Q3-Q4 converter switches (step 506) and the fuel cell stack voltage v1=Vstack and current i1=Vistack/(G2 R0) are recorded at step 508. Next, as shown in step 510, the duty cycle is abruptly changed. A new voltage v2=Vstack and current i1=Vistack/(G2 R0) are immediately measured at step 512. Again, Rs is simply (v2−y1)/(i2−i1). Care must be taken to allow the stack current reading to stabilize long enough, but not so long that the fuel cell chemistry begins to change. This is done by matching low-pass filter cutoff frequency, DC-DC converter switching frequency, and the measurement period appropriately.

In accordance with this aspect of the present invention, since the voltage jump is small, resolution of the analog to digital conversion (ADC) circuitry can be an issue. Thus, a sample and hold methodology, coupled with an instrumentation amplifier is used in accordance with the invention to amplify the resistance signal in a practical application. The output of the DC-DC converter 226 (FIG. 2), which can be used to calculate the resistance, is provided to an associated measuring device (not show) that can be programmed to perform a sample and hold technique, which will include an instrumentation amplifier (not shown) that will amplify the resistance signal. Rapid measurements can thus be made and several readings could be averaged over time. These readings can be averaged using a Kalman filter to determine an accurate estimated amount of resistance across the stack or array with no additional hardware necessary in the fuel cell stack that is already used with DC-DC switches. As will be understood by those skilled in the art, the Kalman filter is a data processing algorithm that incorporates discrete time measurement samples, which combines all available measurement data, plus prior knowledge about the system and measuring devices to produce an estimate of the desired variables in such a manner that error is minimized statistically.

In this manner, the present invention provides an accurate measurement of stack resistance without the need for additional hardware. Using these accurate measurements, the condition of the fuel cell stack can be evaluated. In particular, fuel cell hydration can be inferred from the resistance measurements.

As herein described, an evaluation of cell hydration is made based upon the change in the resistance over time. If a decrease in cell hydration is detected, then appropriate corrective action can be taken in order to maintain optimal, continued operation of the fuel cell stack.

It should be understood that the method and system of the present invention allow frequent measurements of the rate of resistance during fuel cell stack operation and frequent measurement of stack resistance during stack operation with no additional hardware required in certain instances.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of determining resistance in a fuel cell comprising the steps of:
   (A) providing a DC-DC converter with an associated microcontroller;
   (B) adjusting input parameters of said DC-DC converter, using said microcontroller, to establish an initial duty cycle;
   (C) reading a stack voltage and the stack current;
   (D) changing the duty cycle;
   (E) substantially immediately measuring the fuel cell voltage and fuel cell current; and
   (F) calculating resistance based upon measurements.

2. The method of determining resistance, as defined in claim 1 comprising the further step of:
   evaluating any changes in resistance over time as a measure of fuel cell hydration.

3. The method of determining resistance, as defined in claim 1, wherein said fuel cell comprises one of the following:
   (A) a fuel cell stack;
   (B) a fuel cell array; and
   (C) an individual fuel cell.

4. The method of determining resistance, as defined in claim 3, wherein a fuel cell in said fuel cell stack, said fuel cell array, or said individual fuel cell is a direct oxidation fuel cell.

5. The method of determining resistance, as defined in claim 4, wherein said direct oxidation fuel cell is a direct methanol fuel cell.

6. The method of determining resistance, as defined in claim 3, wherein a fuel cell in said fuel cell stack, said fuel cell array, or said individual fuel cell is a hydrogen fuel cell.

7. A method of measuring resistance across a direct oxidation fuel cell stack that includes programmable DC-DC switches including the steps of:
   (A) using said programmable DC-DC switches to switch a load on and off said fuel cell stack;
   (B) signaling an associated microprocessor under pulse-width modulation control to adjust the duty cycle of said DC-DC switches;
   (C) measuring voltage changes as said switches change;
   (D) calculating a change in resistance over time; and
   (E) predicting cell hydration based upon said changes.

* * * * *